United States Patent [19]
Schmidt

[11] Patent Number: 5,325,197
[45] Date of Patent: Jun. 28, 1994

[54] TELEVISION SIGNAL PROCESSING UNIT WHICH PROVIDES MONITORING DURING PERIODS OF THE TELEVISION SIGNAL TO DETECT ERRONEOUS CIRCUIT OPERATION

[75] Inventor: Friedrich Schmidt, Erlangen, Fed. Rep. of Germany

[73] Assignee: U.S. Philips Corporation, New York, N.Y.

[21] Appl. No.: 919,010

[22] Filed: Jul. 23, 1992

[30] Foreign Application Priority Data

Aug. 1, 1991 [DE] Fed. Rep. of Germany ....... 4125460

[51] Int. Cl.⁵ ............................................. H04N 5/04
[52] U.S. Cl. .................................................. 348/181
[58] Field of Search ................. 358/139, 10, 160, 148; 371/27, 38, 20; H04N 17/00, 17/04

[56] References Cited

U.S. PATENT DOCUMENTS

| | | | |
|---|---|---|---|
| 4,635,096 | 1/1987 | Morgan | 358/139 X |
| 4,907,181 | 3/1990 | Hedtke et al. | 358/139 X |
| 4,931,877 | 6/1990 | Gebhardt et al. | 358/139 X |
| 5,047,855 | 9/1991 | Correa | 358/139 |

FOREIGN PATENT DOCUMENTS

| | | |
|---|---|---|
| 2049259 | 3/1972 | Fed. Rep. of Germany . |
| 0192292 | 7/1990 | Japan .............. H04N 17/04 |
| 1321189 | 10/1971 | United Kingdom . |

OTHER PUBLICATIONS

M. Gendsior et al., "HD-MAC-Ubertragung mit 140 Mbit/s", NTZ, vol. 42, 1989, No. 9, pp. 638–647.

Primary Examiner—Victor R. Kostak
Attorney, Agent, or Firm—Leroy Eason

[57] ABSTRACT

A television signal processing unit which provides monitoring to detect erroneous operation of one or more circuit sections thereof during periods of the television signal. The processing unit includes a test signal generator and an evaluation circuit, the test signal generator supplying a test signal to a circuit section of the processing unit during allocated periods of each picture frame. The evaluation circuit compares the processed test signal produced by such circuit section with a predetermined specimen signal corresponding to correct circuit operation, and produces an error indication when the processed test signal differs from the specimen signal. The allocated test periods may be during portions of each picture frame which are not assigned to video information, or during other portions of a picture frame wherein no video information is actually present.

8 Claims, 3 Drawing Sheets

TELEVISION SIGNAL PROCESSING UNIT WHICH PROVIDES MONITORING DURING PERIODS OF THE TELEVISION SIGNAL TO DETECT ERRONEOUS CIRCUIT OPERATION

BACKGROUND OF THE INVENTION

The invention relates to a television signal processing unit which provides monitoring to detect erroneous operation of one or more of the circuit sections thereof. Such a processing unit may be, for example, for processing the red, green or blue signal of a HDTV television camera in a HDMAC transmitter. The term "television signal" is herein to be understood to refer to a component video signal (for example, a red signal, a colour difference signal, a luminance signal, etc.), or a processed component video signal, or any of a plurality of combined video component signals.

The paper "HD-MAC Uebertragung mit 140 MBit/s" by M. Gendsior, J. Wenger, J. Witzany, NTZ, Vol. 42, 1989, no. 9, pp. 638-647 describes, for example a processing unit for a HDMAC television signal being shown in FIG. 2 thereof on page 640. This Figure shows a coder for generating HDMAC signals and a decoder for decoding the HDMAC signals.

SUMMARY OF THE INVENTION

It is an object of the invention to provide a television signal processing unit wherein an error caused by a circuit section thereof during operation is detected in a simple manner and without long delay times. Such a processing unit comprises at least a test signal generator coupled to an input of a circuit section of the processing unit for supplying at least one test signal during allocated periods of the television signal, and an evaluation circuit coupled to an output of the circuit section of the processing unit for comparing the processed test signal resulting at the output of the circuit section with a predetermined specimen signal and for indicating an error when the processed test signal deviates therefrom.

In the processing of television signals via a processing unit, the signal may become distorted because a circuit section of the processing unit is defective. According to the invention, in order to test a circuit section of the processing unit, a test signal is supplied to such circuit section during a period of a television signal. The resultant output test signal at the output of the circuit section is then tested to determine if it undistorted. To this end the output test signal is compared with a specimen signal which represents an undistorted output test signal. The test signal generator is supplies the test signal during a given period of the television signal. During such given period the evaluation circuit evaluates the output test signal in the received television signal. The specimen signal can be generated in a computer whose program represents a memory map of the circuit section to be tested (reference software).

A HDTV television signal has periodically repeating periods which are part of a picture. Such a HDTV picture has 1,728 columns and 1,250 lines, i.e. a total of 1,728*1,250 pixels. The actual picture information range in which the luminance and chrominance information is transmitted comprises 1,440 columns and 1,152 lines. The rest of the picture does not comprise any information. If a test signal is to be transmitted during the transmission of pictures, this test signal can be introduced in a period of the picture which is free of picture information (testing range), for example before the start of the picture information range. It is alternatively possible to supply test signals during the picture information, if there is no luminance and chrominance information. The test signals may comprise given test sequences with which particular functions within a circuit section can be examined. For example, the function for processing a red signal can be tested by means of a test sequence for that particular function.

An embodiment of the test signal generator comprises an analysis circuit for determining periodically occurring periods of a television signal, an address counter which resets to an initial value and starts or ends counting as controlled by the analysis circuit a memory for producing a test signal sample value stored therein at an address determined by the address counter, and a switch controlled by the analysis circuit to supply either of the test signal and the television signal to a circuit section of the processing unit to be tested, When picture information components are being processed during error monitoring, the analysis circuit determines a test range during which at least one test signal is transmitted and no picture information components are transmitted, in addition to the picture information range during which further processing of at least one test signal takes place. The first memory generates the test signal from a sequence of sampling values which are stored at addresses therein and are read-out by the address counter. The address counter is enabled by the analysis circuit when the counter contents are to be changed. The analysis circuit also controls the switch which one position supplies the test signal and in its second position supplies the television signal to a circuit section under test.

The analysis circuit comprises a first period counter which counts successive periods of the television signal and a decoding circuit which evaluates the count and generates control signals for the address counter and the switch. The first period counter may count, for example the pixels of a picture. During the test range periods the decoding circuit enables the first address counter to generate addresses for the memory.

An embodiment of the evaluation circuit comprises an analysis circuit for determining periodically occurring periods of a television signal, an address counter which resets its count to an initial value and for starts or ends counting under the control of the analysis circuit.

a memory for producing a specimen signal sample values stored there at an address determined by the second address counter, and a comparison circuit for comparing the specimen signal sample value with the output test signal and for indicating an error when the output test signal deviates from the specimen signal sample value.

Similarly as the analysis circuit in the test signal generator, the analysis circuit in the evaluation circuit determines ranges for generating a signal. The memory in the evaluation circuit comprises addresses used by the address counter for generating a specimen signal. In the comparison circuit succeeding the memory the specimen signal is compared with the output test signal received from the circuit section being tested. If a difference is established between the specimen signal and the output test signal, the comparison circuit indicates an error.

The analysis circuit in the evaluation circuit comprises a period counter for counting periods of the television signal and a decoding circuit for evaluating the count and generating control signals for the address counter and the comparison circuit. The address counter here, as in the test generator, may also count the pixels of a picture. During a given period in which a specimen signal is to be generated by the evaluation circuit the decoding circuit therein enables the address counter therein.

The analysis circuits in the test signal generator and the evaluation circuit are provided for determining a period which is free from picture information, in which period at least one test signal is supplied. When a test signal is supplied in a period which is free from picture information, the individual circuit sections of a processing unit can be tested without disturbing the picture information (luminance and chrominance signal).

The circuit sections of the processing unit may also be tested when no picture information is actually being transmitted. In this case the two analysis circuits may additionally supply and evaluate at least one test signal during the picture information range.

Such a processing unit may be particularly used in a receiver or transmitter arrangement for transmitting HDTV signals. Such arrangements are, for example, studio equipment, mixers, cameras etc.. These are complex digital signal processing circuits, and an error may not be readily recognized when simple test methods are used. The invention may advantageously be used in such complex circuits, because it renders it possible to detect error sources in a simple manner.

These and other aspects of the invention will be apparent from and elucidated with reference to the embodiments described hereinafter.

DETAILED DESCRIPTION OF THE PREFERRED EMBODIMENTS OF THE INVENTION

Figure 1:
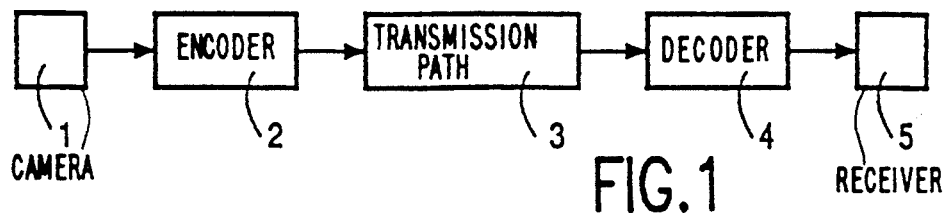
FIG. 1 shows a HDTV transmission system.

FIG. 1 shows a HDTV transmission system. The HDMAC television signal is generated by a transmitter arrangement comprising a camera 1 and an encoder 2 and is transmitted via a transmission path 3 which may be, for example, a satellite transmission system. The HDMAC television signals supplied through the transmission path 3 are further processed in a receiver arrangement. This receiver arrangement comprises a decoder 4 and a receiver 5. The encoder 2 is used for bit rate reduction and for coding as a composite HDMAC television signal comprising the red, green and blue component signals supplied by the camera. The decoder 4 converts the HDMAC television signals supplied through the transmission path 3 into television signals suitable for the receiver 5.

Figure 2:
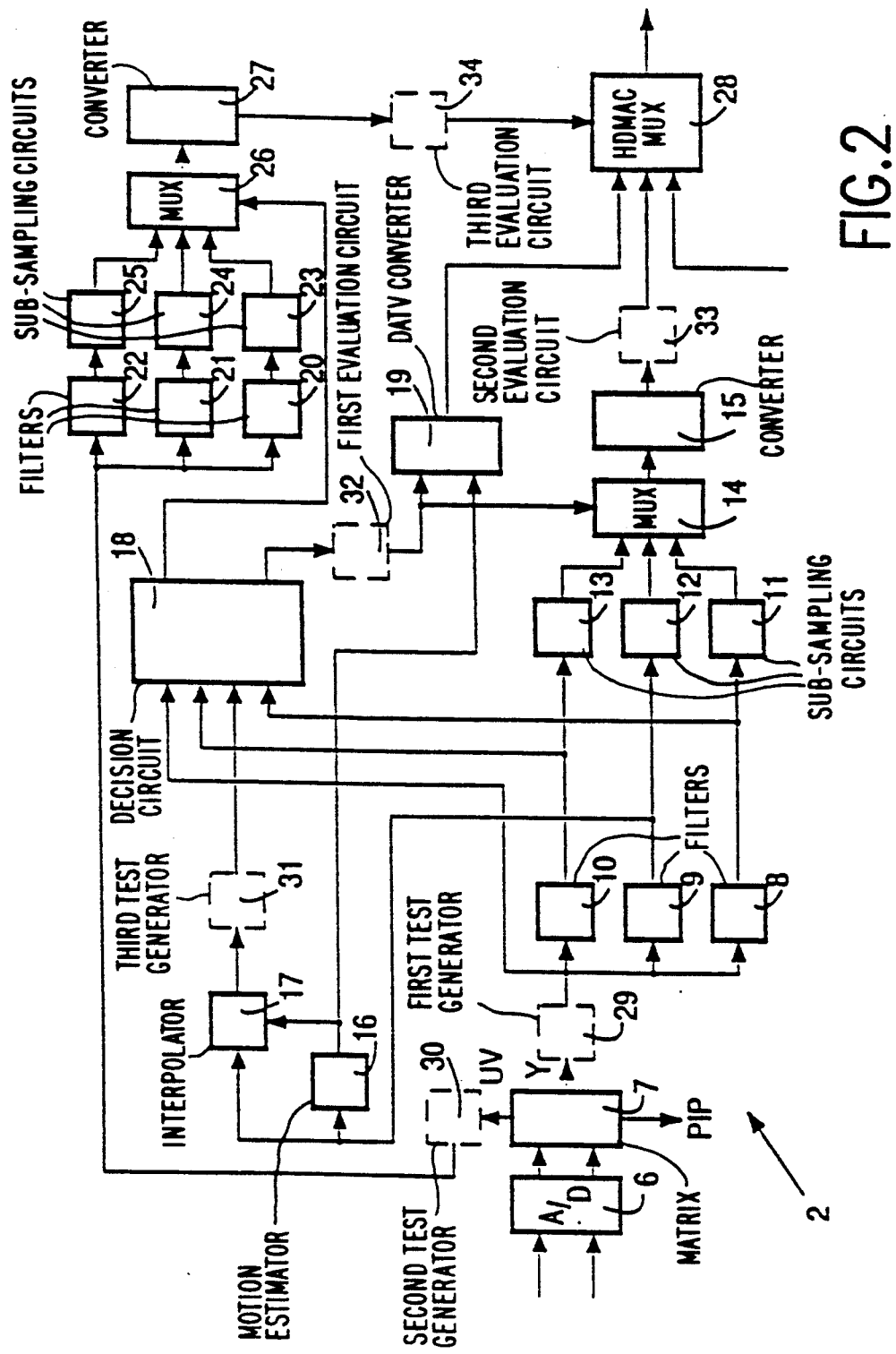
FIG. 2 shows an encoding circuit used in the transmission system of FIG. 1.

FIG. 2 is a block diagram of a known encoder 2. This encoder comprises an A/D converter 6 which receives red, green and blue signals and synchronizing information from a camera 1. The digitized signals are supplied to a matrix circuit 7 which generates two colour difference signals U and V, one synchronizing luminance signal Y and one signal PIP which indicates the start of the first line of a picture.

Figure 3:
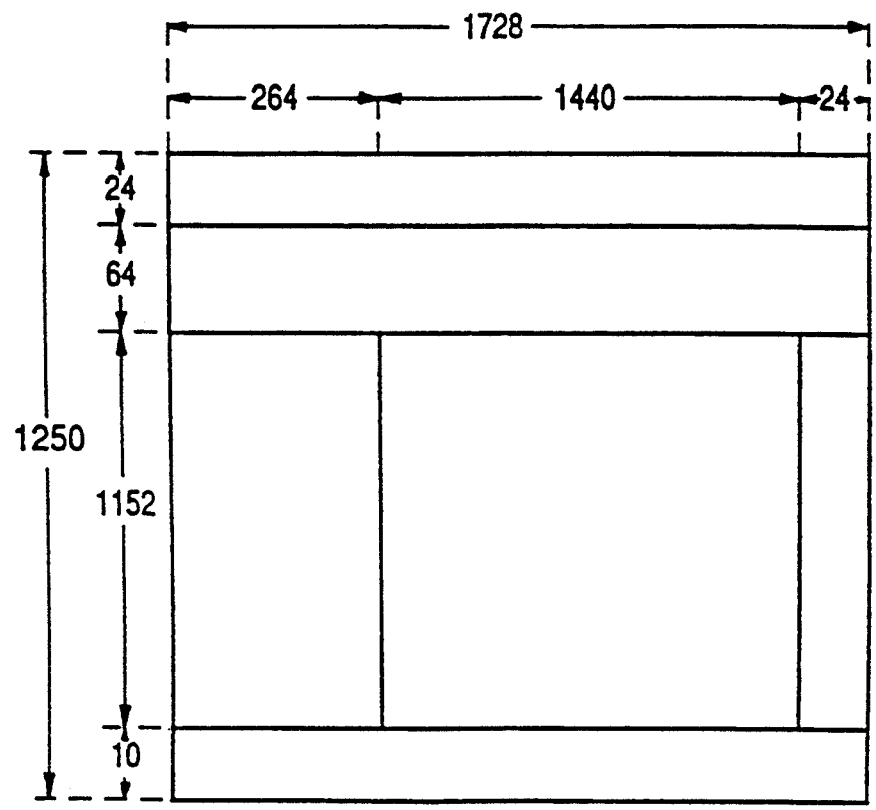
FIG. 3 shows the format of a HDTV picture.

FIG. 3 shows the format of a HDTV picture frame. The first 88 lines of such a picture frame do not contain any information. The picture information range starts at the 89th line and the 264th column. The picture information range ends at line 1,240 and column 1,704. The remaining 10 lines do not contain any information.

The luminance signal Y is further applied to three filters 8, 9 and 10. The filter 8 only passes data representing picture areas with little motion or stationary pictures. The filter 9 passes data representing picture areas of average motion, and the filter 10 passes data representing picture areas of fast motion. The output signals of the filters 8 to 10 are sub-sampled in circuits 11 to 13. A multiplexer 14 multiplexes the sub-sampled output signals of circuits 11 to 13 to a converter 15, which converts the signal format.

The output signals of the average motion filter 9 are applied to a motion estimator 16 and an interpolator 17. The motion estimator 16 determines motion vectors of each odd picture field with the aid of the two adjacent even fields. The interpolator 17 reconstructs an odd field from two successive even fields and the motion vectors. This odd field and the adjacent even fields are applied to a decision circuit 18. The decision circuit 18 also receives the luminance signal Y from the matrix 7 and the output signals of the filters 8 and 10. The output signal of the interpolator 17 and the output signals of the two filters 8 and 10 are compared by decision circuit 18 with the luminance signal Y, the comparison being performed in blocks, each of which comprises a plurality of pixels. The decision circuit 18 decides which output signals of the filters 8 to 10 are to be transmitted. This decision is supplied to the multiplexer 14, which thereupon connects its output to the relevant ones of the circuits 11 to 13.

The decision of the decision circuit 18 and the motion vectors produced by motion estimator 16 are further applied to the DATV encoder 19 (DATV=Digitally Assisted Television) wherein they are encoded in the DATV format. The colour difference signals U and V, which are supplied by the matrix 7, are applied to filters 20 to 22 which pass data representing picture areas of fast, average and little motion. The output signals of the filters 20 to 21 are sub-sampled in circuits 23 to 25. An output signal of a circuits 23 to 25 are applied for each block via a multiplexer 26 to a converter 27 which has the same function as the converter 15. The multiplexer 26 is controlled by the decision circuit 18. The output signals of the two converters 15 and 27 and of the DATV encoder 19 are combined in a HDMAC multiplexer 28. Similarly, audio signals and additional data such as, for example video text are applied to the HDMAC multiplexer 28. The HDMAC television signal is formed from these signals in the HDMAC multiplexer 28.

In order to monitor whether a circuit section of the encoder 2 operates flawlessly, a plurality of test generators 29 to 31 and a plurality of evaluation circuits 32 to 34 are arranged in the encoder 2. A test generator 29 to 31 introduces a test signal into the television signal, which is passed through one or more circuit sections of the encoder 2. The output test signal resulting at the output of the circuit section is compared with a stored specimen signal in an evaluation circuit 32 to 34. If the output test signal deviates from the specimen signal, an error indication is given by which, fir example, a light-emitting diode or a display screen unit is activated. A first test generator 29 is arranged between the matrix 7 and the filters 8 to 10. A second test generator 30 precedes the filters 20 to 22 and a third test generator 31 is arranged at the output of the interpolator 17. A first evaluation circuit 32 is arranged between the decision circuit 18 and the DATV encoder 19. A second evaluation circuit 33 is connected to the output of the converter 15 and a third evaluation circuit 34 is connected to the output of the converter 26.

A test signal may be incorporated, for example in scan lines 25 to 64 (cf. FIG. 3) of the picture frame. If there is no picture information, the test signal may also be incorporated in the picture information range. In that case one or further test signals would be additionally present in the lines 65 to 1,152.

Figure 4:
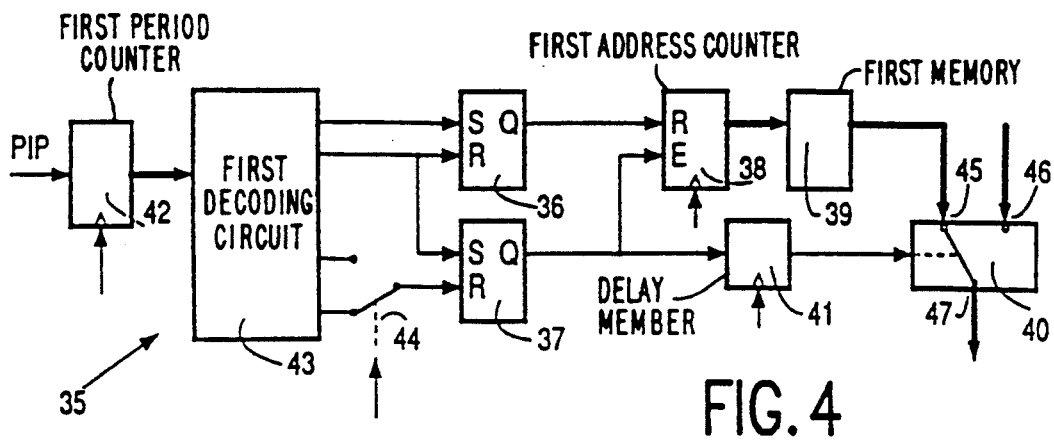
FIG. 4 shows a test generator used in the encoding circuit of FIG. 3.

A test signal generator 29, 30 or 31 is shown in FIG. 4. This generator comprises an analysis circuit 35, two RS bistable elements 36 and 37, an address counter 38, a element 39, a switch 40 and a delay element 41. The analysis circuit 35 comprises a period counter 42 and a decoding circuit 43. The period counter 42 is reset by the synchronizing signal PIP at the start of a picture field. Upon the occurrence of each pixel the period counter 42 raises its counter content. The frequency of the clock signal applied to the period counter 42 thus corresponds to the frequency of the pixel sequence. The count of the period counter 42 is evaluated by the decoding circuit 43, which comprises a plurality of logic elements. At the start of the first line of a picture, when the counter content is 1, the RS bistable element 36 is set by a pulse from decoding circuit 43. A pulse resetting the first address counter 38 to a count of zero then results at the Q output of the RS bistable element 36. The decoding circuit 43 determines the start of the test range. The test range starts at the 25th line at pixel 41.473. When this count is reached, a pulse is applied from the decoding circuit 43 to the reset input of the RS bistable element 36 and to the set input of the RS bistable element 37. The pulse then resulting at the Q output of the RS bistable element 37 enables the address counter 38 (supplied to the enable input E) and is applied to the delay member 41.

The decoding circuit 43 further evaluates the end of the test range and the end of line 1,240. When the end of the test range is reached, i.e. the end of the 64th line or the pixel 110.592, a pulse is generated by the decoding circuit 43. A pulse is also generated at the end of line 1,240, or at pixel 2,142.720. A switch 44 applies either a pulse at the end of the test range or a pulse at the end of line 1,240 to the rest input of the RS bistable element 37. If only a test signal is to be generated in the test range, a pulse is applied to the reset input of the RS bistable element 37 when the end of the test range is reached. Based on the resetting of RS bistable element 37, the address counter 38 is inhibited.

The counts of the address counter 38 constitute addresses of test signal sampling values stored in the memory 39. The output of the memory 39 is connected to a first input 45 of the switch 40. The television signal is applied to the other input 46 of the switch 40. The switch 40 is controlled by the output signal at the Q output of the RS bistable element 37 ias delayed by the delay element 41. The delay element 41 and the first address counter 38 also receive the clock signal. The delay time in the delay member 41 is equal to the delay period which is required by address counter 38 and first memory 39 for generating the test signal. In the first position of the switch 40 its input 45 is connected to its output 47. During this period the "test range" period of the television signal is present. In the second position of the switch, its input 46 is connected to its output 47.

Figure 5:
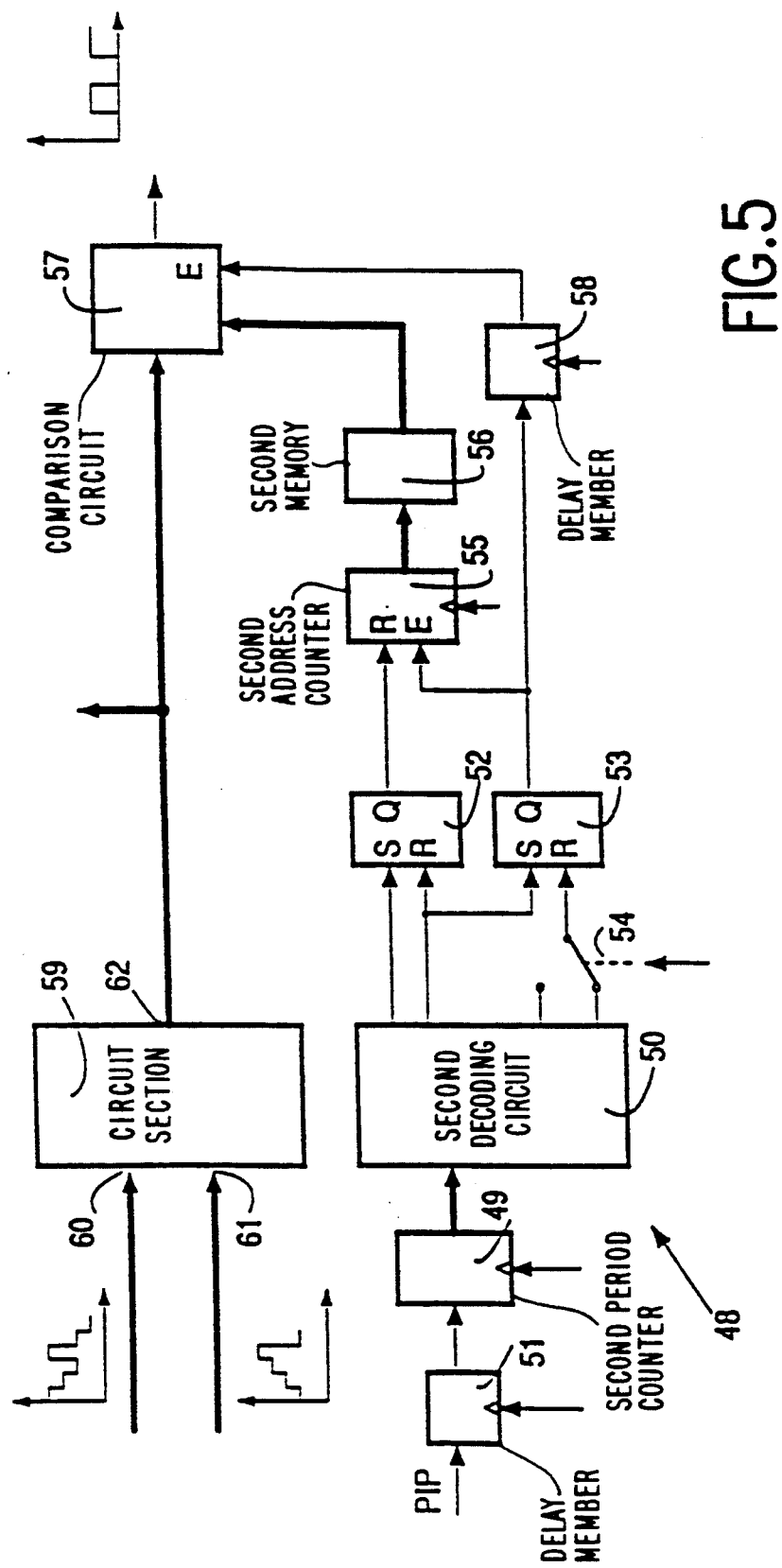
FIG. 5 shows an evaluation circuit used in the encoding circuit of FIG. 3.

The output test signals at the output of a circuit section are evaluated by an evaluation circuit 32, 33 or 34 as shown in FIG. 5. This evaluation circuit comprises an analysis circuit 48 having a period counter 49 and a decoding circuit 50. The synchronizing signal PIP is applied via a delay element 51 to the reset input of the period counter 49. The delay time of the delay element 51 corresponds to the delay time of the test signal through the circuit section to be tested. The count of the period counter 49 is set to zero by the synchronizing signal PIP. The clock signal is also applied to the period counter 49 and to the delay element 51. The decoding circuit 50 has the same function as the decoding circuit 43 in FIG. 4. The count of the period counter 49 is evaluated by the decoding circuit 50, which supplies pulse at the start of the first line to the set input of an RS bistable element 52. When the test range starts, a pulse is applied to the reset input of the RS bistable element 52 and to the set input of a further RS bistable element 53. At the end of the test range or at the end of line 1,240 a pulse is applied to the rest input of the RS bistable element 53 via a switch 54.

At a count of zero an address counter 55 is set by the pulse present at the Q output of the RS bistable element 52. The address counter 55 is enabled via its enable input E by a signal at the Q output of the RS bistable element 53. The counts of the address counter 55 constitute addresses in a memory 56 at which sampling values of a specimen signal are stored for supplying to a comparison circuit 57. The Q output of the RS bistable element 53 is connected via a delay element 58 to the enable input E of the comparison circuit 27. The clock signal is also applied to the address counter 55 and the delay element 58.

FIG. 5 further shows by way of example a circuit section 59 to be tested and which receives a first test signal at its input 60 and a second test signal at its input 61. A part of each such test signal is shown in FIG. 5. The output 62 of the circuit section 59 is a television signal which includes an output test signal. During the output test signal the comparison circuit 57 is enabled, and compares such signal and the specimen signal supplied by the memory 56 with each other. If there is a difference between the output test signal and the specimen signal, the comparison circuit 57 gives an error indication in the form of a pulse. Such a pulse may be used for activating a light-emitting diode or a display screen.

I claim:

1. A processing unit for processing a supplied television signal representing successive frames of a television picture, said processing unit comprising:
   at least one circuit section for processing an input signal supplied thereto which has been derived from said television signal by one or more other circuit sections of said processing unit;
   a test signal generator coupled to the input of said one circuit section for supplying a test signal thereto during allocated periods of the television signal, each allocated period being during a portion of a picture frame during which video information is not present, said one circuit section producing from the supplied test signal a processed test signal at an output thereof;

an evaluation circuit coupled to the output of said one circuit section for comparing the processed test signal with a predetermined specimen signal corresponding to a correct processing of the supplied test signal by said one circuit section, and for producing an error indication when the processed test signal differs from the specimen signal; and said test signal generator comprising:
 an analysis circuit for selecting said allocated periods of the television signal;
 an address counter controlled by the analysis circuit to produce address counts which begin and end concurrently with the beginning and end of each of said allocated periods of television signal;
 a memory having address locations for storing therein respective samples of said test signal, the stored test signal samples being supplied from said memory in response to the address counts produced by said address counter; and
 switching means coupled to said memory and controlled by said analysis circuit to switch the input of said one circuit section so as to receive test signal samples supplied by said memory during said allocated periods of the television signal and to receive said input signal during other periods of the television signal.

2. A processing circuit as claimed in claim 1, wherein the analysis circuit comprises a period counter for counting successive allocated periods of the television signal, and a decoding circuit for evaluating the count of the period counter and based thereon generating control signals for said address counter and said switching means.

3. A processing circuit as claimed in claim 2, wherein the analysis circuit selects as allocated periods of the television signal periods thereof which are not assigned to video information.

4. A processing circuit as claimed in claim 3, wherein the analysis circuit further selects as allocated periods of the television signal periods thereof which are assigned to video information but wherein no video information is present.

5. A processing unit for processing a supplied television signal representing successive frames of a television picture, said processing unit comprising:
 at least one circuit section for processing an input signal supplied thereto which has been derived from said television signal by one or more other circuit sections of said processing unit;
 a test signal generator coupled to the input of said one circuit section for supplying a test signal thereto during allocated periods of the television signal, each allocated period being during a portion of a picture frame during which video information is not present, said one circuit section producing from the supplied test signal a processed test signal at an output thereof;
 an evaluation circuit coupled to the output of said one circuit section for comparing the processed test signal with a predetermined specimen signal corresponding to a correct processing of the supplied test signal by said one circuit section, and for producing an error indication when the processed test signal differs from the specimen signal; and said evaluation circuit comprising:
 an analysis circuit for detecting the allocated periods of the television signal during which a test signal is supplied to said one circuit section;
 an address counter controlled by the analysis circuit to produce address counts which begin and end concurrently with the beginning and end of each of said allocated periods of the television signal;
 a memory having address locations for storing therein respective samples of said specimen signal, the stored samples being supplied from said memory in response to the address counts produced said address counter; and
 a comparison circuit coupled to said memory and controlled by said analysis circuit to compare the specimen signal samples supplied by said memory with samples of the processed test signal produced by said one circuit section, and produce said error indication when the processed test signal samples differ from the specimen signal samples.

6. A processing circuit as claimed in claim 5, wherein said analysis circuit comprises a period counter for counting successive allocated periods of the television signal, and a decoding circuit for evaluation the count of the period counter and based thereon producing control signals for said address counter and said comparison circuit.

7. A processing circuit as claimed in claim 6, wherein the analysis circuit detects allocated periods of the television signal which are not assigned to video information.

8. A processing circuit as claimed in claim 7, wherein the analysis circuit further detects allocated periods of the television signal which are assigned to video information but wherein no video information is present.

* * * * *